(12) United States Patent
Nabeshima

(10) Patent No.: US 12,307,795 B2
(45) Date of Patent: May 20, 2025

(54) IMAGE PROCESSING APPARATUS, IMAGE PROCESSING METHOD, IMAGE CAPTURING APPARATUS, AND STORAGE MEDIUM

(71) Applicant: CANON KABUSHIKI KAISHA, Tokyo (JP)

(72) Inventor: Rui Nabeshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 18/165,992

(22) Filed: Feb. 8, 2023

(65) Prior Publication Data

US 2023/0260299 A1 Aug. 17, 2023

(30) Foreign Application Priority Data

Feb. 14, 2022 (JP) .................... 2022-020794
Nov. 28, 2022 (JP) .................... 2022-189533

(51) Int. Cl.
G06V 20/70 (2022.01)
G06F 16/58 (2019.01)
H04N 5/92 (2006.01)

(52) U.S. Cl.
CPC .............. *G06V 20/70* (2022.01); *G06F 16/58* (2019.01); *H04N 5/9201* (2013.01); *G06V 2201/10* (2022.01)

(58) Field of Classification Search
CPC .... G06V 20/70; G06V 2201/10; G06F 16/58; G06F 16/51; G06F 16/55; H04N 5/9201; H04N 23/61; H04N 23/80
See application file for complete search history.

(56) References Cited

U.S. PATENT DOCUMENTS

| | | | | |
|---|---|---|---|---|
| 2005/0105776 A1* | 5/2005 | Luo | .................. | G06V 20/10 382/115 |
| 2008/0162450 A1* | 7/2008 | McIntyre | ............ | G06F 16/5838 707/999.005 |
| 2011/0191271 A1* | 8/2011 | Baker | ................ | G06N 20/00 706/46 |
| 2018/0197105 A1* | 7/2018 | Luo | .................. | G06F 16/355 |
| 2019/0220666 A1* | 7/2019 | Kiepe | ................ | G06V 10/764 |
| 2020/0242154 A1* | 7/2020 | Haneda | .............. | G06F 16/535 |
| 2020/0250451 A1* | 8/2020 | Oda | ................. | G06V 10/87 |
| 2023/0360368 A1* | 11/2023 | Aoyama | ............. | H04N 5/92 |
| 2023/0401257 A1* | 12/2023 | Hung | ................. | G06F 16/73 |
| 2024/0203127 A1* | 6/2024 | Kamani | .............. | H04N 7/183 |

FOREIGN PATENT DOCUMENTS

JP 2015-099559 A 5/2015
WO WO-2022158106 A1 * 7/2022 ............... G06T 3/40

* cited by examiner

*Primary Examiner* — Timothy J Henn
(74) *Attorney, Agent, or Firm* — Cowan, Liebowitz & Latman, P.C.

(57) ABSTRACT

An image processing apparatus comprises a generation unit configured to generate an image file of captured image data, the generation unit generating the image file with estimation results related to the image data added thereto as metadata, wherein the generation unit generates the metadata so that a first estimation result and a second estimation result are distinguishable from each other, the first estimation result being based on data that is included in the image file, the second estimation result being based on data that is not included in the image file.

13 Claims, 13 Drawing Sheets

F I G. 4A

401

```
{
 "name":"Annotation",
 "version":"1.00",
 "PEDESTRIAN":{
 "NUMBER OF PEOPLE":"2",
 "INPUT":"IMAGE"
 "COORDINATE": {(x0,y0,w0,h0),(x1,y1,w1,h1)}
 },
 "PRECEDING VEHICLE"{
 "DISTANCE":"20m",
 "INPUT":"LINK TO SENSOR DATA IN Depth-IMAGE"
 },
 "TRAVELING STATE":{
 "SPEED":"55Km/h",
 "RAPID ACCELERATION":"HIGH FREQUENCY"
  "INPUT":"AUTOMOBILE SENSOR"
 },
}
```

FIG. 4B

```
{
 "name":"Annotation1",
 "version":"1.00",
 "PEDESTRIAN":{
 "NUMBER OF PEOPLE":"2",
 "COORDINATE": {(x0,y0,w0,h0),(x1,y1,w1,h1)}
 },
 "PRECEDING VEHICLE"{
 "DISTANCE":"20m",
 "INPUT":"LINK TO SENSOR DATA IN Depth-IMAGE"
 },
}
```
402

```
{
 "name":"Annotation2",
 "version":"1.00",
 "TRAVELING STATE":{
 "SPEED":"55km/h",
 "RAPID ACCELERATION":"HIGH FREQUENCY"
 "INPUT":"AUTOMOBILE SENSOR"
 },
}
```
403

FIG. 7A

```
[
  {
    "name":"Annotation",
    "version":"2.00",
    "PEDESTRIAN":{
    "NUMBER OF PEOPLE":"3",
    "INPUT":"IMAGE"
    "COORDINATE":  {(X0',y0',w0',h0'),(x1',y1',w1',h1'),(x3,y3,w3,h3)}
    },
    "PRECEDING VEHICLE"{
    "DISTANCE":"22m",
    "INPUT":"LINK TO SENSOR DATA IN Depth-IMAGE"
    },
    "TRAVELING STATE":{
    "SPEED":"55Km/h",
    "RAPID ACCELERATION":"HIGH FREQUENCY"
    "INPUT":"AUTOMOBILE SENSOR"
    },
  },
  {
    "name":"Annotation",
    "version":"1.00",
    "PEDESTRIAN":{
    "NUMBER OF PEOPLE":"2",
    "INPUT":"IMAGE"
    "COORDINATE": {(x0,y0,w0,h0),(x1,y1,w1,h1)}
    },
    "PRECEDING VEHICLE"{
    "DISTANCE":"20m",
     "INPUT":"LINK TO SENSOR DATA IN Depth-IMAGE"
    },
    "TRAVELING STATE":{
     "SPEED":"55Km/h",
    "RAPID ACCELERATION":"HIGH FREQUENCY"
    "INPUT":"AUTOMOBILE SENSOR"
    },
  }
]
```

```
{
 "version":"2.00",
 "PEDESTRIAN":{
  "NUMBER OF PEOPLE":"3",
  "INPUT":"IMAGE"
  "COORDINATE'": {(X0',y0',w0',h0'),(x1',y1',w1',h1'),(x3,y3,w3,h3)}
 },
 "PRECEDING VEHICLE"{
  "DISTANCE":"22m",
  "INPUT":"LINK TO SENSOR DATA IN Depth-IMAGE"
 },
}
```
~712

```
{
 "name":"Annotation2",
 "version":"1.00",
 "TRAVELING STATE":{
  "SPEED":" /h",
  "RAPID ACCELERATION":"HIGH FREQUENCY",
  "INPUT":"AUTOMOBILE SENSOR"
 },
}
```
~713

IMAGE PROCESSING APPARATUS, IMAGE PROCESSING METHOD, IMAGE CAPTURING APPARATUS, AND STORAGE MEDIUM

BACKGROUND OF THE INVENTION

Field of the Invention

The present invention relates to an image processing technique to process images captured by a digital camera and the like.

Description of the Related Art

In recent years, artificial intelligence (AI) techniques that use, for example, deep learning have been utilized in a wide variety of technical fields.

For example, conventionally, digital still cameras and the like are provided with a function of detecting a human face from a shot image; Japanese Patent Laid-Open No. 2015-99559 discloses a technique to detect and recognize such animals as dogs and cats with high accuracy without limiting a detection target to humans.

Meanwhile, with an increase in the importance of detectable information attributed to the advancement of subject detection techniques, input images, which are detection targets, and the detected results serve as important information that can be utilized in various ways in a later workflow. For example, various types of information that are predicted from images using AI techniques and the like are used as very important input data in a wide variety of fields, such as automation of robots, autonomous driving of automobiles, and so forth.

Furthermore, in a case where the estimation results are added to an image file using AI, the value as input data can be increased by using information obtained from various types of sensors in addition to recorded image data.

For example, pre-shooting live images, sound data, information of various types of sensors (a sensor inside a camera, and a sensor of a device that is in coordination with the camera), and the like can be used.

Moreover, as the advancement of an AI model allows obtainment of more accurate estimation results, after the estimation has been performed, the AI model may be changed and the estimation may be performed again.

However, there are cases where an image file does not include information other than a shot image. When the estimation is performed again with respect to the image file, the estimation results based on information that is not included in the image file cannot be obtained, and the estimation results that were added at the time of shooting cannot be updated appropriately.

SUMMARY OF THE INVENTION

The present invention has been made in view of the aforementioned problem, and provides an image processing apparatus that can appropriately update the estimation results when the estimation is performed again with respect to an image file.

According to a first aspect of the present invention, there is provided an image processing apparatus comprising: at least one processor or circuit configured to function as a generation unit configured to generate an image file of captured image data, the generation unit generating the image file with estimation results related to the image data added thereto as metadata, wherein the generation unit generates the metadata so that a first estimation result and a second estimation result are distinguishable from each other, the first estimation result being based on data that is included in the image file, the second estimation result being based on data that is not included in the image file.

According to a second aspect of the present invention, there is provided an image processing method comprising: generating an image file of captured image data, the image file being generated with estimation results related to the image data added thereto as metadata, wherein in the generating, the metadata is generated so that a first estimation result and a second estimation result are distinguishable from each other, the first estimation result being based on data that is included in the image file, the second estimation result being based on data that is not included in the image file.

Further features of the present invention will become apparent from the following description of exemplary embodiments with reference to the attached drawings.

BRIEF DESCRIPTION OF THE DRAWINGS

FIGS. 4A and 4B are diagrams showing an overview of annotation data recorded on the digital camera.

FIGS. 7A-7D are diagrams showing an overview of annotation data that is recorded in a case where re-estimation has been performed on the digital camera.

DESCRIPTION OF THE EMBODIMENTS

Figure 1:
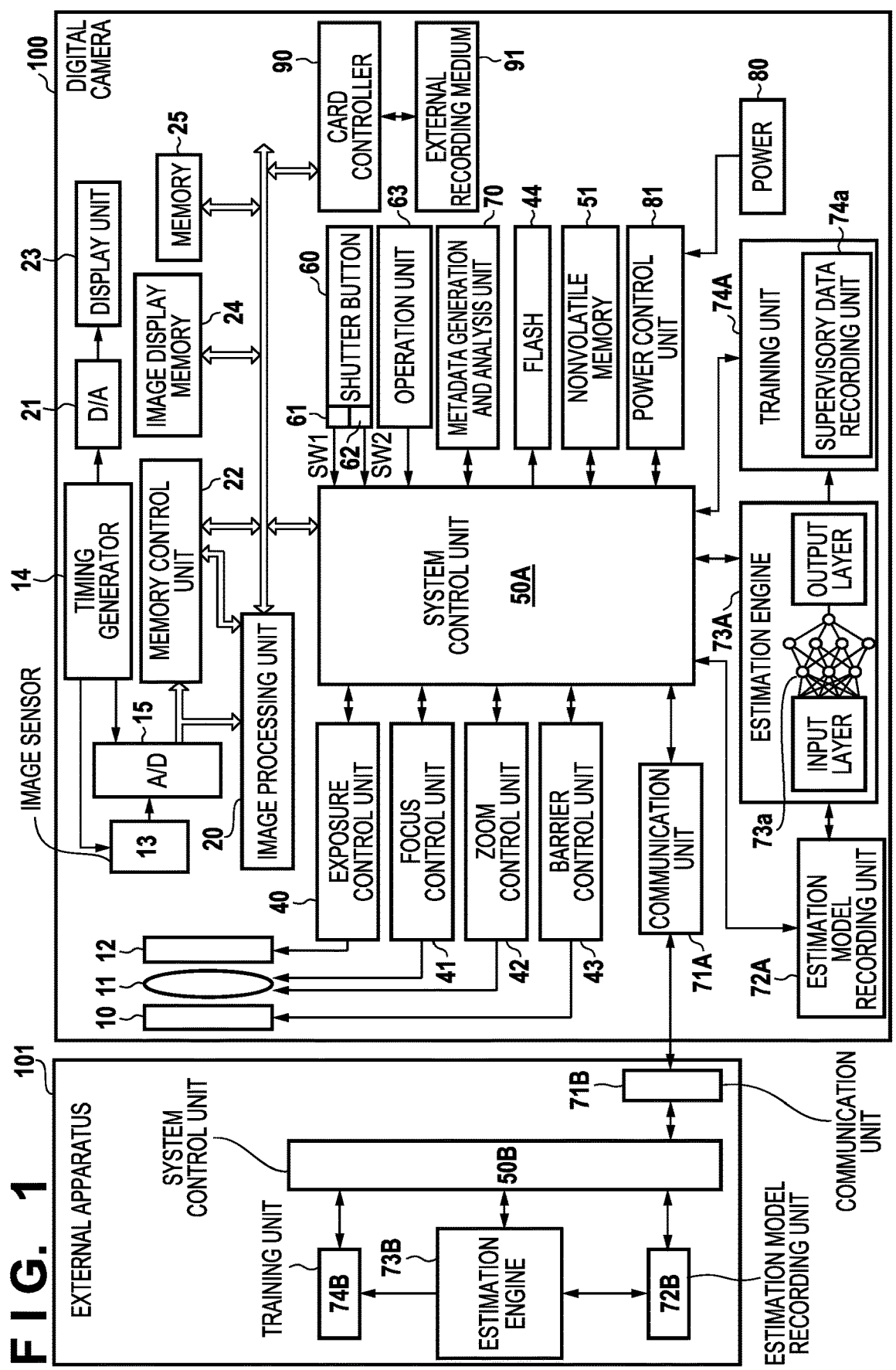
FIG. 1 is a block diagram showing a configuration of a digital camera according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Furthermore, although the following description exemplarily depicts a digital camera as an image processing apparatus that classifies subjects using an estimation model, it goes without saying that the image processing apparatus according to the present invention is not limited to the digital camera. The image processing apparatus according to the present invention may be any device as long as it is an image processing apparatus that reads out images recorded in a recording apparatus and displays the images, and may be, for example, a smartphone, a tablet PC, or the like.

FIG. 1 is a block diagram showing an exemplary configuration of a digital camera 100 according to an embodiment of the present invention.

In FIG. 1, a barrier 10 is a protection member that covers an image capturing unit of the digital camera 100, which includes a photographing lens 11, so as to prevent the image capturing unit from getting soiled or damaged, and its operations are controlled by a barrier control unit 43. The photographing lens 11 causes an optical image to be formed on an image capturing surface of an image sensor 13. A shutter 12 has a diaphragm function. The image sensor 13 is composed of, for example, a CCD or CMOS sensor or the like, and converts the optical image that has been formed on the image capturing surface by the photographing lens 11 via the shutter 12 into electrical signals.

An A/D converter 15 converts analog image signals output from the image sensor 13 into digital image signals. The digital image signals converted by the A/D converter 15 are written to a memory 25 as so-called RAW image data pieces. In addition to this, development parameters corresponding to respective RAW image data pieces are generated based on information at the time of shooting, and written to the memory 25. Development parameters are composed of various types of parameters that are used in image processing for recording based on a JPEG method or the like, such as an exposure setting, white balance, color space, and contrast.

A timing generator 14 is controlled by a memory control unit 22 and a system control unit 50A, and supplies clock signals and control signals to the image sensor 13, the A/D converter 15, and a D/A converter 21.

An image processing unit 20 executes various types of image processing, such as predetermined pixel interpolation processing, color conversion processing, correction processing, and resize processing, with respect to data from the A/D converter 15 or data from the memory control unit 22. The image processing unit 20 also executes predetermined image processing and computation processing using image data obtained through image capture, and provides the obtained computation result to the system control unit 50A. The system control unit 50A realizes AF (autofocus) processing, AE (automatic exposure) processing, and EF (preliminary flash emission) processing by controlling an exposure control unit 40 and a focus control unit 41 based on the provided computation result.

Furthermore, the image processing unit 20 executes predetermined computation processing using image data obtained through image capture, and also executes AWB (auto white balance) processing based on the obtained computation result. Moreover, the image processing unit 20 reads in image data stored in the memory 25, and executes compression processing, such as compression processing based on a JPEG method, an MPEG-4 AVC method, an High Efficiency Video Coding (HEVC) method, or the like and lossless compression processing for uncompressed RAW data, or decompression processing. Then, the image processing unit 20 writes the image data for which processing has been completed to the memory 25.

Also, the image processing unit 20 executes predetermined computation processing using image data obtained through image capture, and executes editing processing with respect to various types of image data. Specifically, it can execute trimming processing in which the display range and size of an image are adjusted by causing unnecessary portions around image data not to be displayed, and resize processing in which the size is changed by enlarging or reducing image data, display elements of a screen, and the like. Furthermore, it can perform RAW development whereby image data is generated by applying image processing including color conversion and the like to data that has undergone compression processing, such as lossless compression for uncompressed RAW data, or decompression processing, and converting the resultant data into a JPEG format. Moreover, it can execute moving image cutout processing in which a designated frame of a moving image format, such as MPEG-4, is cut out, converted into a JPEG format, and stored.

Furthermore, the image processing unit 20 also executes, for example, processing for superimposing On-Screen Display (OSD), such as a menu and no particular characters to be displayed on a display unit 23, over image data for display.

In addition, the image processing unit 20 executes subject detection processing for detecting a subject that exists within image data and detecting a subject region thereof using, for example, input image data and information of a distance to the subject at the time of shooting, which is obtained from, for example, the image sensor 13. As detectable information, detection information including region information indicating the position and size within an image, as well as the inclination and certainty, can be obtained.

The memory control unit 22 controls the A/D converter 15, the timing generator 14, the image processing unit 20, an image display memory 24, the D/A converter 21, and the memory 25. RAW image data generated by the A/D converter 15 is written to the image display memory 24 or the memory 25 via the image processing unit 20 and the memory control unit 22, or directly via the memory control unit 22.

The image data for display that has been written to the image display memory 24 is displayed on the display unit 23, which is composed of a TFT LCD or the like, via the D/A converter 21. An electronic viewfinder function for displaying live images can be realized by sequentially displaying image data pieces obtained through image capture with use of the display unit 23.

The memory 25 has a storage capacity that is sufficient to store a predetermined number of still images and moving images of a predetermined time period, and stores still images and moving images that have been shot. Furthermore, the memory 25 can also be used as a working area for the system control unit 50A.

The exposure control unit 40 controls the shutter 12, which has a diaphragm function. Furthermore, the exposure control unit 40 also exerts a flash light adjustment function by operating in coordination with a flash 44. The focus control unit 41 performs focus adjustment by driving a non-illustrated focus lens included in the photographing lens 11 based on an instruction from the system control unit 50A. A zoom control unit 42 controls zooming by driving a non-illustrated zoom lens included in the photographing lens 11. The flash 44 has a function of emitting AF auxiliary light, and a flash light adjustment function.

The system control unit 50A controls the entirety of the digital camera 100. A nonvolatile memory 51 is an electrically erasable and recordable nonvolatile memory; for example, an EEPROM or the like is used thereas. Note that not only programs, but also map information and the like are recorded in the nonvolatile memory 51.

A shutter switch 61 (SW1) is turned ON and issues an instruction for starting operations of AF processing, AE processing, AWB processing, EF processing, and the like in the midst of an operation on a shutter button 60. A shutter switch 62 (SW2) is turned ON and issues an instruction for starting a series of shooting operations, including exposure processing, development processing, and recording processing, upon completion of the operation on the shutter button

60. In the exposure processing, signals that have been read out from the image sensor 13 are written to the memory 25 as RAW image data via the A/D converter 15 and the memory control unit 22. In the development processing, using the computations performed by the image processing unit 20 and the memory control unit 22, RAW image data that has been written to the memory 25 is developed and written to the memory 25 as image data. In the recording processing, the image data is read out from the memory 25 and compressed by the image processing unit 20, and the compressed image data is stored to the memory 25 and then written to an external recording medium 91 via a card controller 90.

An operation unit 63 includes such operation members as various types of buttons and a touchscreen. It includes, for example, a power button, a menu button, a mode changeover switch for switching among a shooting mode, a reproduction mode, and other special shooting modes, directional keys, a set button, a macro button, and a multi-screen reproduction page break button. It also includes, for example, a flash setting button, a button for switching among single shooting, continuous shooting, and self-timer, a menu change + (plus) button, a menu change − (minus) button, a shooting image quality selection button, an exposure correction button, a date/time setting button, and so forth.

In recording image data in the external recording medium 91, a metadata generation and analysis unit 70 generates various types of metadata, such as the Exchangeable image file format (Exif) standard to be attached to the image data, based on information at the time of shooting. Also, when image data recorded in the external recording medium 91 has been read in, the metadata generation and analysis unit 70 analyzes metadata added to the image data. Examples of metadata include setting information at the time of shooting, image data information related to image data, feature information of a subject included in image data, and so forth. Furthermore, in recording moving image data, the metadata generation and analysis unit 70 can also generate and add metadata with respect to each frame.

A power 80 is composed of, for example, a primary battery such as an alkaline battery and a lithium battery, a secondary battery such as a NiCd battery, a NiMH battery, and a Li battery, or an AC adapter. A power control unit 81 supplies power supplied from the power 80 to each component of the digital camera 100.

The card controller 90 exchanges data with the external recording medium 91, which is a memory card or the like. The external recording medium 91 is composed of, for example, a memory card; images (still images and moving images) shot by the digital camera 100 are recorded therein.

Using an estimation model recorded in an estimation model recording unit 72A, an estimation engine 73A performs estimation with respect to image data that has been input via the system control unit 50A. As the estimation model, an estimation model that has been input from outside, such as an external apparatus 101, via a communication unit 71A and recorded in the estimation model recording unit 72A, or an estimation model obtained through the execution of re-training in a re-training unit 74A, can be used. Note, it is assumed that the estimation model recording unit 72A or the like holds management versions of estimation models so that each estimation model can be identified in a case where the estimation models have been updated from outside, or in a case where the estimation models have been updated through the execution of re-training in the training unit 74A. The estimation engine 73A also includes a neural network design 73a.

In the neural network design 73a, intermediate layers (neurons) are arranged between an input layer and an output layer. The system control unit 50A inputs image data, sound data, and various types of sensor information (sensor information inside the camera, and sensor information of an external device obtained via the communication unit 71A) to the input layer. Different neural network designs may be provided for different types of inputs. Neurons in several layers are arranged as the intermediate layers. The number of layers of neurons is determined as appropriate in terms of design, and the number of neurons in each layer is also determined as appropriate in terms of design. The intermediate layers are weighted based on the estimation model recorded in the estimation model recording unit 72A. Annotation information corresponding to information input to the input layer is output to the output layer.

The present embodiment is based on the assumption that an estimation model for estimating classification, that is to say, what kind of subject is included in an image, is used. A trained estimation model that has been generated through deep learning by using image data of various subjects as input data, and by using the result of classification thereof (e.g., classification of animals such as dogs and cats, classification of subjects such as humans, animals, plants, and buildings, and so forth) as supervisory data, is obtained from the external apparatus 101 or the like. Note that as the estimation engine 73A can be updated from the external apparatus 101 or the like, other various estimation models may be handled.

Upon receiving a request from the system control unit 50A or the like, the training unit 74A re-trains the estimation model. The training unit 74A includes a supervisory data recording unit 74a; information related to supervisory data to be provided to the estimation engine 73A is recorded in the supervisory data recording unit 74a. The training unit 74A can cause the estimation engine 73A to be re-trained using the supervisory data recorded in the supervisory data recording unit 74a, and update the estimation engine 73A using the estimation model recording unit 72A.

The communication unit 71A includes a communication circuit for performing transmission and reception. The communication circuit may specifically represent wireless communication of Wi-Fi, Bluetooth®, or the like, or wired communication of Ethernet, USB, or the like. The communication unit 71A can communicate with a communication unit 71B of the external apparatus 101. The communication unit 71A functions as a communication unit that exchanges not only image files to which annotation information generated by the estimation engine 73A has been added, but also various types of information including the estimation model, supervisory data, and the like, with the system control unit 50A and a system control unit 50B. It can also place restrictions on information to be transmitted, depending on whether the external apparatus 101 is related to the camera.

The external apparatus 101 includes a training unit 74B, an estimation engine 73B, an estimation model recording unit 72B, the system control unit 50B, and the communication unit 71B. Alternatively, it may be an apparatus that does not include these constituents. The training unit 74B generates an estimation model upon receiving a request from outside, such as the estimation engine 73B and the system control unit 50B. The estimation model transmitted from the digital camera 100 and the estimation model generated by the training unit 74B are recorded in the estimation model recording unit 72B.

Figure 2:
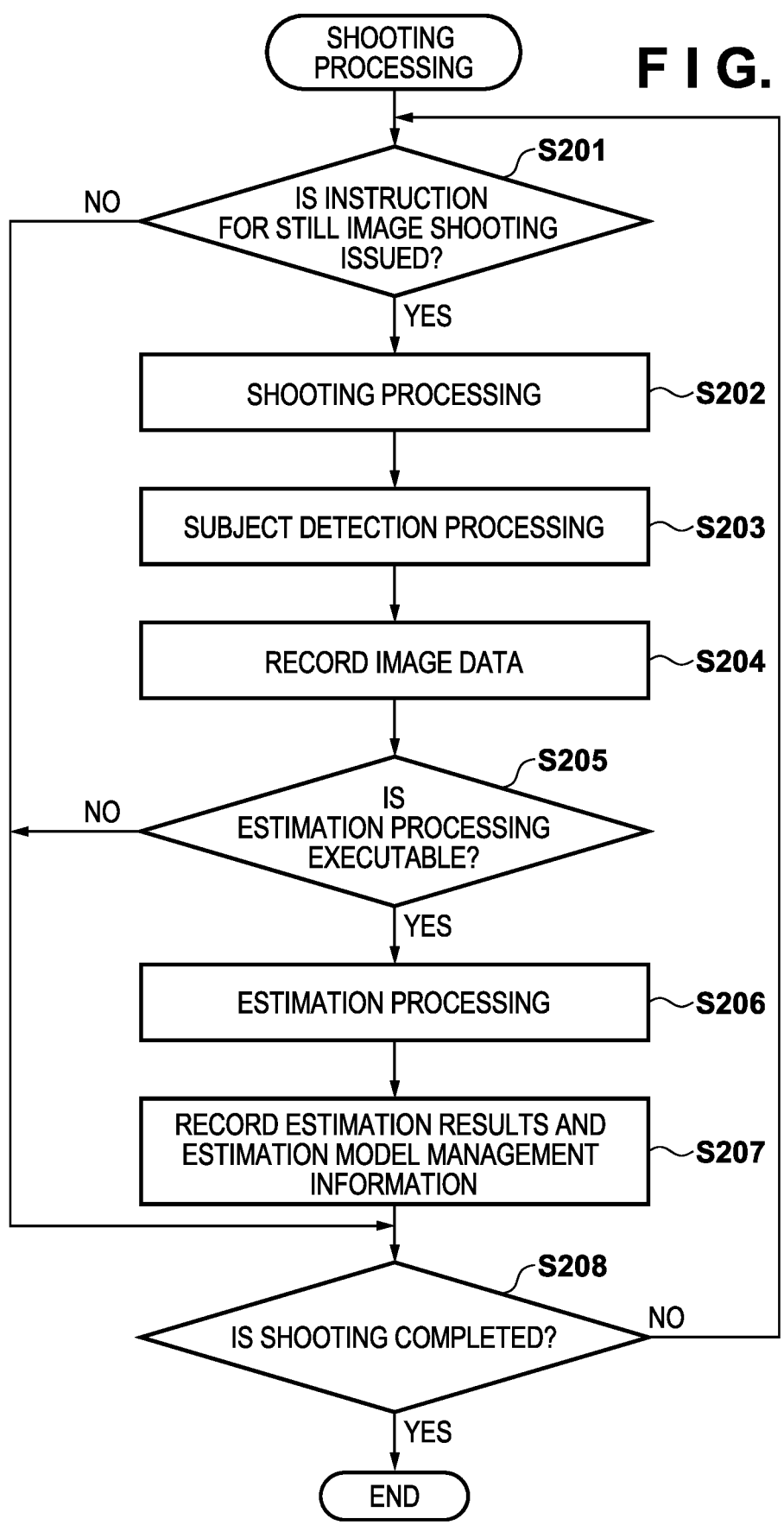
FIG. 2 is a flowchart showing shooting processing of the digital camera.

Next, FIG. 2 is a flowchart showing shooting processing of the digital camera 100. The operations of this flowchart are realized by the system control unit 50A executing a program stored in the nonvolatile memory 51.

First, when an instruction about a shooting mode has been issued by the mode changeover switch included in the operation unit 63, processing is started.

In step S201, the system control unit 50A confirms whether an instruction for still image shooting has been issued as a result of a user turning ON the shutter switches 61 (SW1) and 62 (SW2) by depressing the shutter button 60. The system control unit 50A causes processing to proceed to step S202 in a case where the instruction for still image shooting has been issued, and causes processing to proceed to step S208 in a case where this instruction has not been issued.

In step S202, the system control unit 50A executes shooting processing. In the shooting processing, AF (autofocus) processing and AE (automatic exposure) processing are executed using the focus control unit 41 and the exposure control unit 40, and then image signals that are output from the image sensor 13 via the A/D converter 15 are stored to the memory 25. Furthermore, compressed image data is generated by, in a compression processing unit included in the image processing unit 20, compressing the image signals stored in the memory 25 using a JPEG format or an MPEG-4 HEVC format in conformity with a user setting.

In step S203, the system control unit 50A executes subject detection processing using the image processing unit 20 with respect to the image signals stored in the memory 25, and obtains detection information of subjects included in the image.

In step S204, the system control unit 50A records the image data generated in step S202, the subject detection information obtained in step S203, and various types of sensor information into the external recording medium 91 as an image file. The image file recorded here is recorded in formats shown in FIGS. 3A-3C.

The image file 300 recorded in the present embodiment is composed of at least a region in which metadata conforming to the Exif standard is stored, and an image data region in which compressed image data 305 is recorded. For example, when the user has issued an instruction for recording in a JPEG format, the image file 300 is recorded in the JPEG format, Exif data 301 is recorded in an APP1 marker, and sensor information pieces 308 are recorded in an APP11 marker and the like. As the data sizes of some sensor information pieces are large, it is permissible to decide on which sensor information pieces are to be recorded based on, for example, user setting information. Also, in a case where the user has issued an instruction for recording in a High Efficiency Image File Format (HEIF) format, the image file is recorded in the HEIF file format, and the Exif data 301 is recorded in a Metadata Box and the like. Furthermore, also in a case where an instruction for recording in a RAW format has been issued, the Exif data 301 is similarly recorded in a predetermined region, such as a Metadata Box. The sensor information pieces 308 may be data obtained by sensors provided in the digital camera 100 (e.g., a depth map of the image data obtained by the image sensor 13, etc.), or may be data obtained from an external device instead of the digital camera 100. It is permissible to receive, from an external device connected to the digital camera 100, data obtained by sensors provided in the external device, use received sensor information as input data for estimation, and record the sensor information in an image file.

Using the metadata generation and analysis unit 70, the subject detection information obtained in step S203 is stored inside MakerNote 302, which is included in the Exif data 301 and in which metadata unique to a manufacturer can be described in a basically-undisclosed form. Furthermore, the subject detection information is recorded in annotation data within annotation information. The annotation information is recorded in APP11 and the like. The annotation data is described in a text format, such as XML and JSON.

In step S205, the system control unit 50A confirms whether estimation processing that uses the estimation engine 73A is executable. For example, the estimation processing is not executable in a case where the estimation engine 73A is currently executing processing with respect to another image, in a case where the shooting processing is to be prioritized because the shutter switch 62 (SW2) is still ON and an instruction for continuous shooting has been issued by an operation on the shutter button 60, and the like. The system control unit 50A causes processing to proceed to step S208 in a case where the estimation processing is not executable, and causes processing to proceed to step S206 in a case where the estimation processing is executable.

In step S206, the system control unit 50A executes the estimation processing that uses the estimation engine 73A with respect to the image file 300. In the present embodiment, the image data, sound data, pre-shooting live images, and various types of sensor information are input as inputs to the estimation engine 73A. The input data may partially include data that is not to be written to the image file, such as the sound data and the pre-shooting live images. The various types of sensor information may be data that is to be recorded in the image file, or data that is not to be recorded in the image file. At the time of the estimation, it is permissible to output information related to the estimation processing, such as debug information and logs associated with operations during the estimation, in addition to the estimation results.

In step S207, the system control unit 50A records the estimation results obtained in step S206, as well as a management version, debug information, and the like of the current estimation model held in the estimation model recording unit 72A if any, in the image file as estimation model management information. In writing the estimation results to the image file 300, the image file can be generated by writing the estimation results based on input information that is included in the image file, and the estimation results based on input information that is not included in the image file, separately from each other.

Figure 3A:
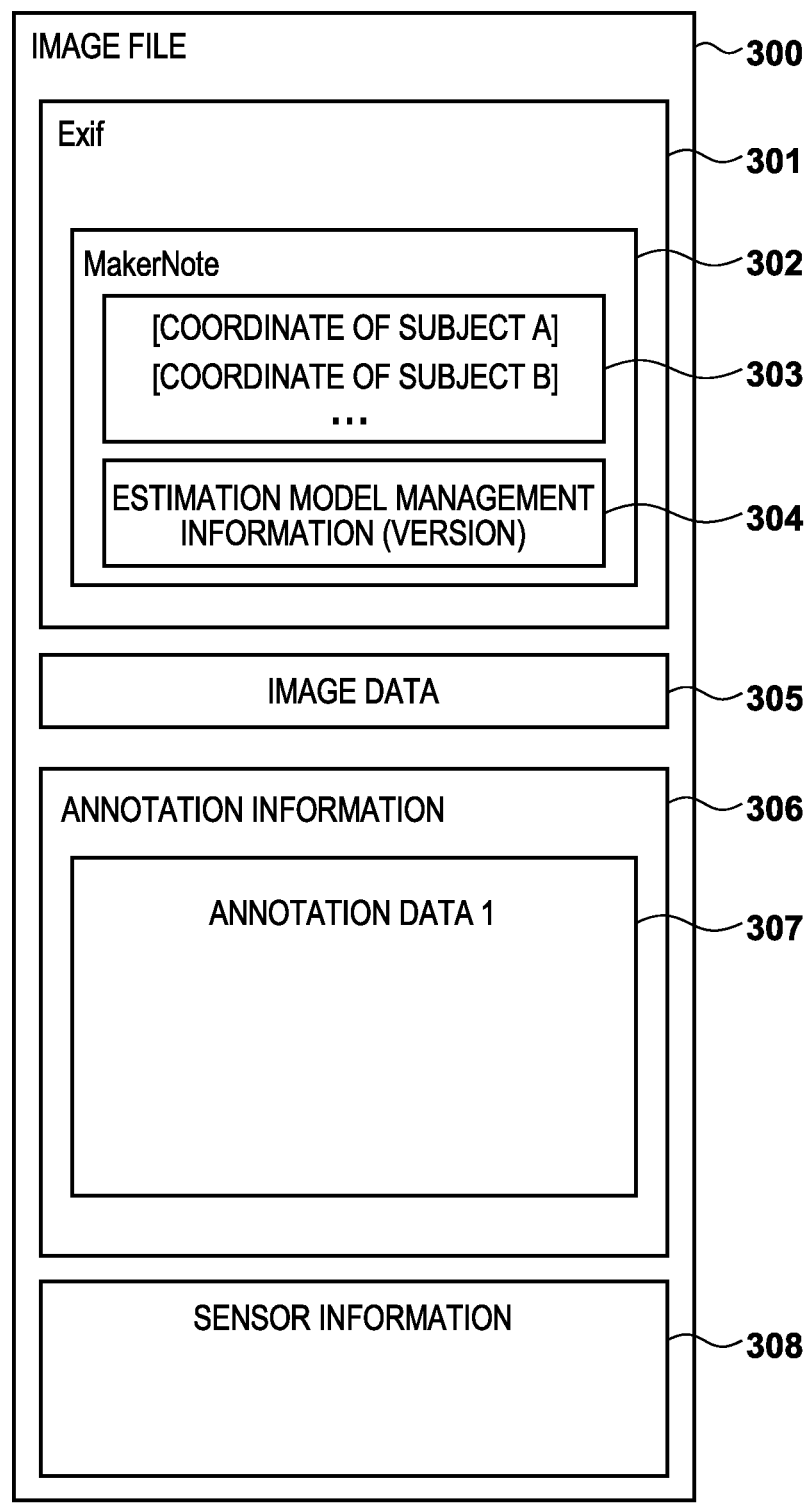
FIGS. 3A-3C are diagrams showing an overview of recorded contents of an image file recorded on the digital camera.

In FIG. 3A, the input information at the time of the estimation is described, as meta-information, in annotation data 307 within annotation information 306. FIG. 4A shows an example of the annotation data 307.

In a case where the input information for the estimation is image data, the fact that the input is an image is described. In a case where the input information for the estimation is not image data but sensor information, information concerning a sensor related to the input is described. In a case where the image file includes sensor information, a link to that sensor information is described.

Figure 3B:
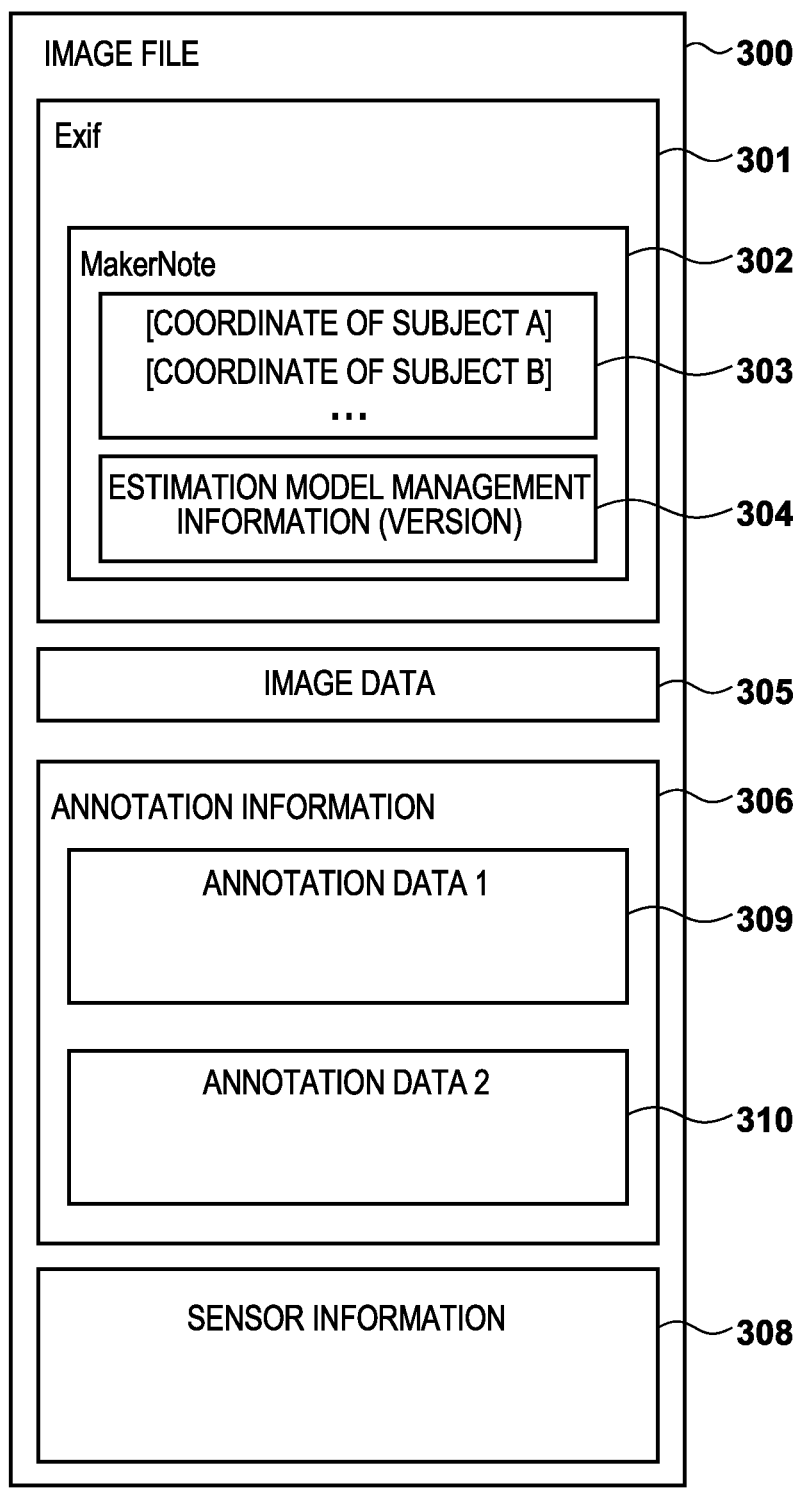
Figure 3C:
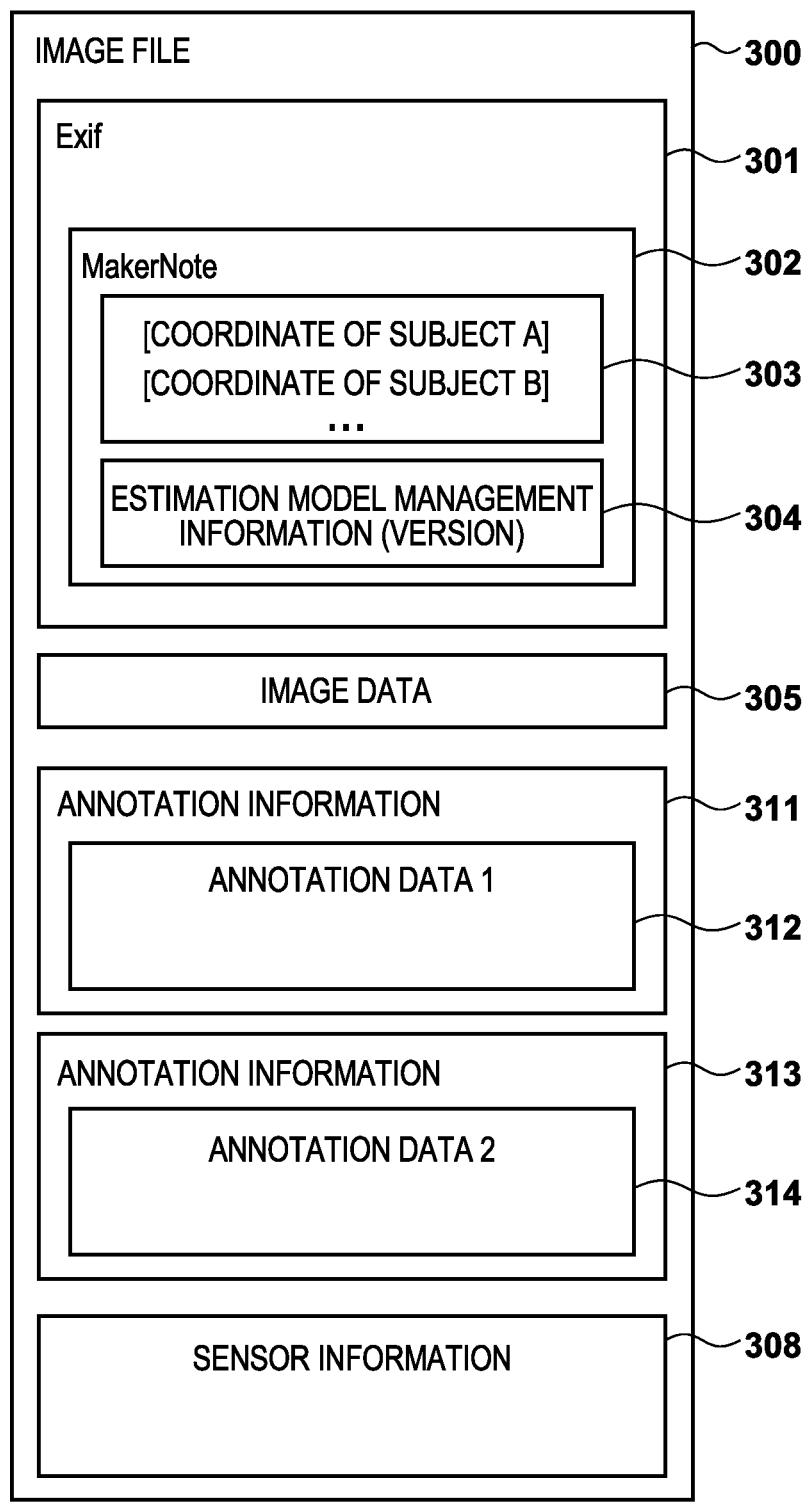

FIG. 3B and FIG. 3C show examples in which the destination to which annotation data is written is divided in accordance with the input information for the estimation.

In FIG. 3B, the locations in which writing is performed are separated within the annotation information 306, as indicated by annotation data 309 and annotation data 310. The estimation results based on input information that is included in the image file are written in the annotation data 309, whereas the estimation results based on input information that is not included in the image file are written in the annotation data 310. Annotation data is written as, for example, a data box of JPEG Universal Metadata Box Format (JUMBF).

In FIG. 3C, a plurality of annotation information pieces are separately written as indicated by annotation information 311 and annotation information 313. The estimation results based on input information that is included in the image file are written as annotation data 312 within the annotation information 311. The estimation results based on input information that is not included in the image file are written as annotation data 314 within the annotation information 313.

Annotation data 402 of FIG. 4B represents an exemplary configuration of the annotation data pieces 309 and 312, which are the estimation results based on input information that is included in the image file. Annotation data 403 of FIG. 4B represents an exemplary configuration of the annotation data pieces 310 and 314, which are the estimation results based on input information that is not included in the image file.

Note that the estimation results of a case where the estimation has been performed using both of input information that is included in the image file and input information that is not included in the image file, are recorded in the image file as the annotation data pieces 310 and 314, which are the estimation results based on input information that is not included in the image file.

The annotation data pieces 309 and 312, which are the estimation results based on input information that is included in the image file, store the estimation results that have been obtained by using only data included in the image file as input information without using data that is not included in the image file.

Returning to the description of FIG. 2, once the user has input a shooting completion instruction via, for example, the mode changeover switch or the power button included in the operation unit 63 in step S208, the system control unit 50A ends the shooting processing.

Figure 5:
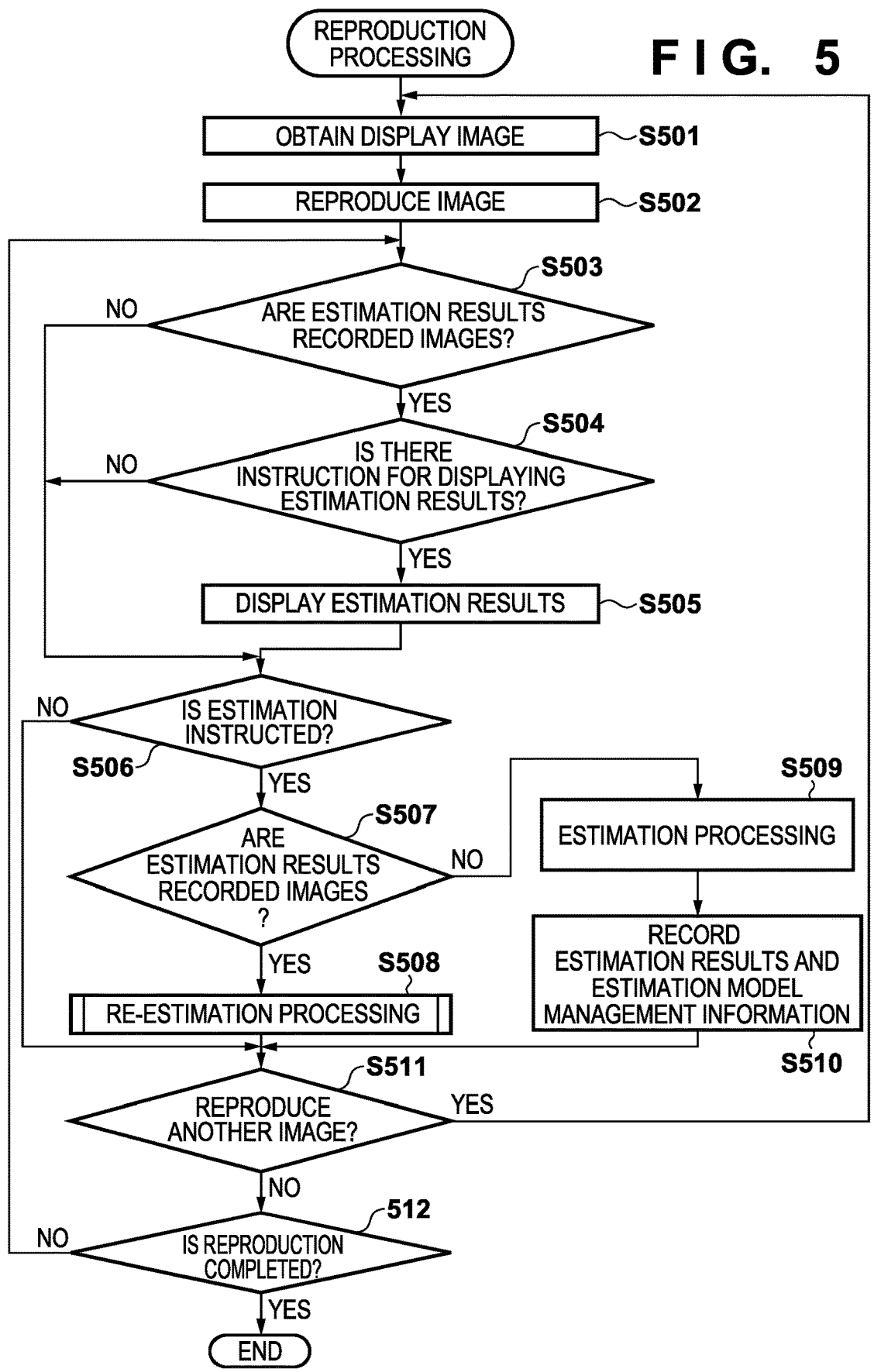
FIG. 5 is a flowchart showing reproduction processing of the digital camera.

Next, FIG. 5 is a flowchart showing reproduction processing of the digital camera 100. The operations of this flowchart are realized by the system control unit 50A executing a program stored in the nonvolatile memory 51.

First, when an instruction about the reproduction mode has been issued by the mode changeover switch included in the operation unit 63, the reproduction processing for viewing image data recorded in the external recording medium 91 is started. Once the reproduction processing has been started, in step S501, the system control unit 50A specifies one image file to be reproduced, and reads in this image file from the external recording medium 91 to the memory 25 via the card controller 90.

In step S502, using the image processing unit 20, the system control unit 50A executes decompression processing, resize processing, and the like with respect to the image file that has been read into the memory 25, in accordance with a recording method. Then, the image file is converted into image data for display, recorded into the image display memory 24, and displayed on the display unit 23.

In step S503, using the metadata generation and analysis unit 70, the system control unit 50A confirms whether the estimation results have already been recorded in the image file that is currently reproduced. If the estimation results have already been recorded, processing proceeds to step S504; if the estimation results have not been recorded yet, processing proceeds to step S506.

In step S504, the system control unit 50A confirms whether the user has issued an instruction for displaying the estimation results that have already been recorded in the image file via an operation member included in the operation unit 63. If the instruction has been issued, processing proceeds to step S505; if the instruction has not been issued, processing proceeds to step S506.

In step S505, the system control unit 50A extracts information related to the estimation results from the annotation data 402 using the metadata generation and analysis unit 70, and displays the extracted information using the image processing unit 20 in such a manner that the extracted information is superimposed over the image data that is currently reproduced. For example, together with frames indicating the coordinate regions of respective subjects described in the annotation data 402, the estimation results obtained by classifying the subjects within these coordinate regions are displayed along with character strings; in this way, the estimation results associated with the image data are displayed so that they are visible to the user.

In step S506, the system control unit 50A confirms whether the user has issued an instruction for estimation with respect to the image file that is currently reproduced via an operation member included in the operation unit 63. Possible examples include a case where it is desired to execute the estimation processing with respect to an image file for which the estimation processing was not able to be executed at the time of shooting, a case where the estimation model has been updated from outside and it is desired to execute the estimation processing again with respect to the image file that has already been recorded, and so forth. In a case where the instruction for estimation has been issued, processing proceeds to step S507; in a case where the instruction for estimation has not been issued, processing proceeds to step S511.

In step S507, the system control unit 50A confirms whether the estimation results have already been recorded in the image file for which the instruction for estimation has been issued. In a case where the estimation results have not been recorded, the system control unit 50A executes processing similar to steps S206 and S207, thereby recording the estimation results and estimation model management information in the image file, in step S509 and step S510. In a case where the estimation results have already been recorded, the system control unit 50A executes re-estimation processing in step S508.

Note that only data included in the image file can be used in this estimation, whereas data that is not included in the image file, such as various types of sensor information (e.g., sensor data of an automobile connected to the camera), can be used as an input for estimation in the estimation processing at the time of shooting.

Figure 6:
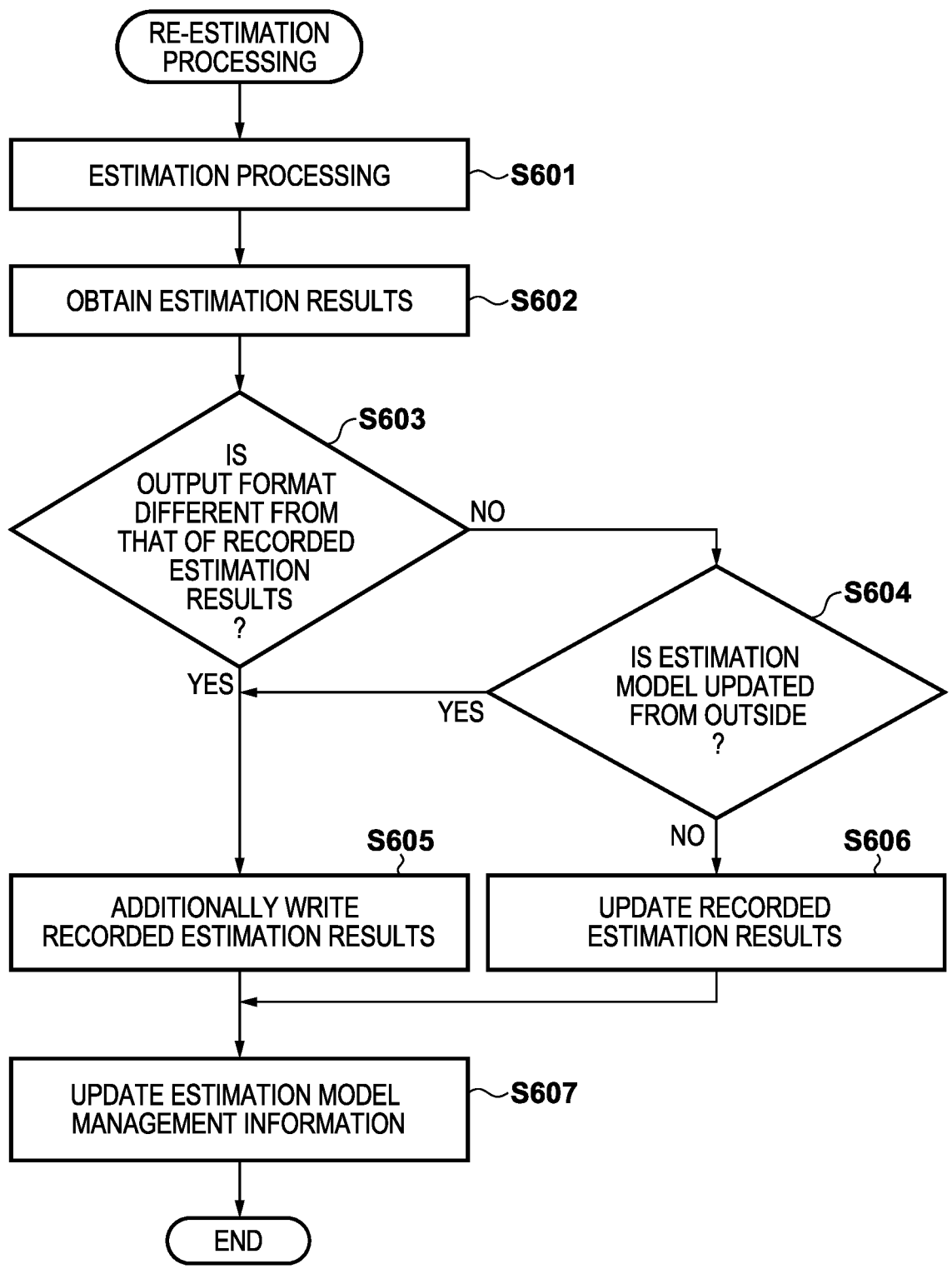
FIG. 6 is a flowchart showing re-estimation processing of the digital camera.

Using FIG. 6, a description is now given of the re-estimation processing executed in step S508. FIG. 6 is a flowchart showing the re-estimation processing executed in step S508.

In step S601, the system control unit 50A performs estimation using the estimation engine 73A, with the image data 305, annotation data, and sensor data 308 within the image file 300 serving as inputs.

In step S602, the system control unit 50A obtains the estimation results.

Note that only data included in the image file can be used in this estimation, whereas data that is not included in the image file, such as various types of sensor information (e.g., sensor data of an automobile connected to the camera), can be used as an input for estimation in the estimation processing at the time of shooting.

In step S603, the system control unit 50A determines whether the output format of the estimation results obtained in step S602 is different from that of the estimation results for the annotation data recorded in the image file. Possible examples of a case where the output format is different include a case where finer classification has become possible as a result of updating the estimation engine 73A, and items, such as details, have been newly added to the output classification results. In a case where the output format is different, processing proceeds to step S605.

On the other hand, in a case where the output format is the same, in step S604, the system control unit 50A determines whether the management version of the estimation engine 73A managed in the estimation model recording unit 72A manages whether the estimation model has been updated from outside and indicates that the update has been performed from outside. In a case where the update has been performed from outside, processing proceeds to step S605.

In step S605, using the metadata generation and analysis unit 70, the system control unit 50A records the re-estimation results in the external recording medium 91 in such a manner that the re-estimation results are additionally written to the original image file 300.

FIG. 7A shows an example of annotation data of a case where an image with annotation data of FIG. 3A has been re-estimated and additionally written.

702 represents the annotation data that has been additionally written, and 703 represents the annotation data before the re-estimation. In the annotation data that has been additionally written, 704 represents data obtained through the re-estimation, and 705 represents input data for the originally-estimated data (in this figure, an automobile sensor). As this input data is not included in the image file, it is not changed from the original data.

Figure 7B:
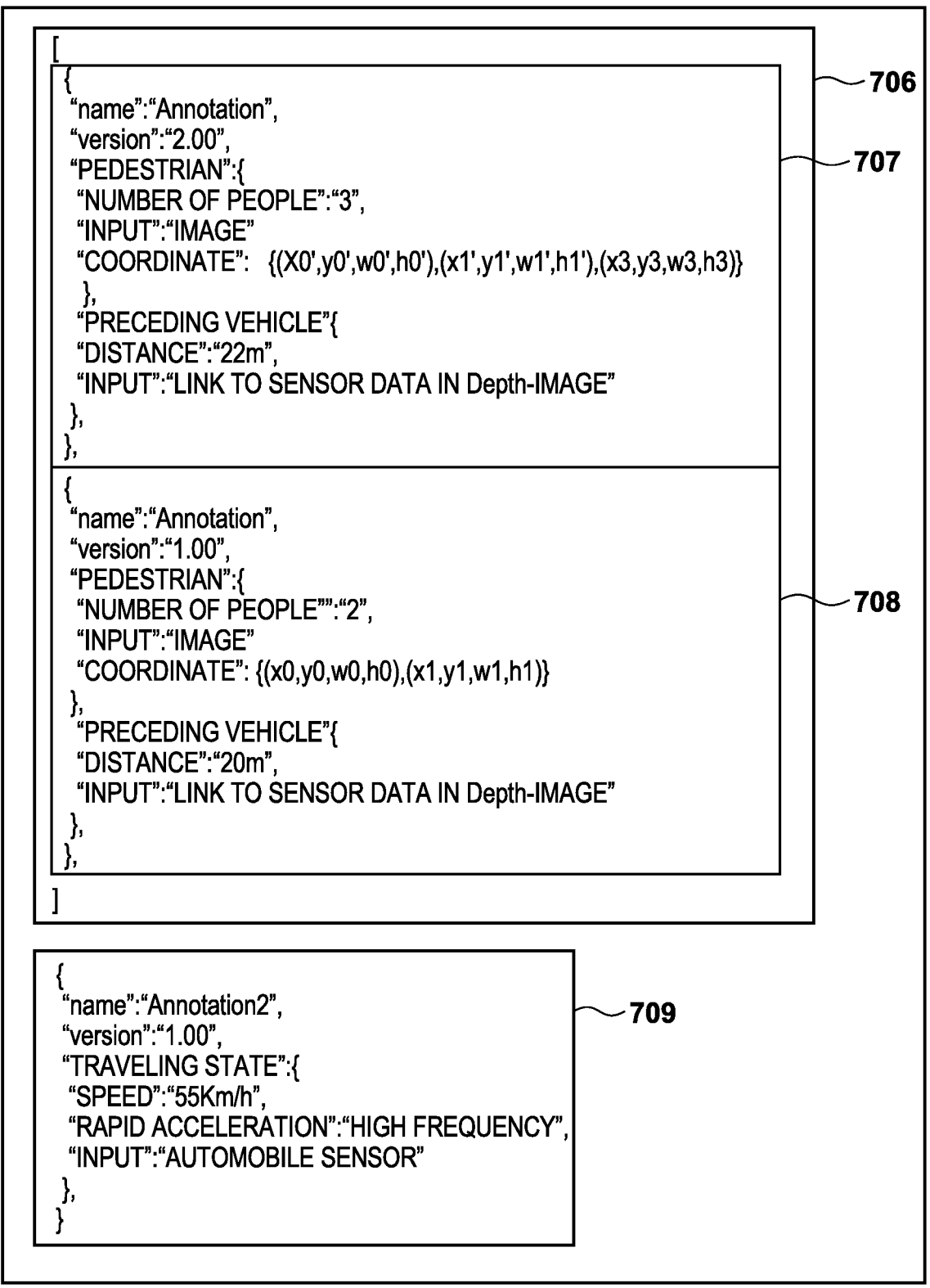

FIG. 7B shows an example of annotation data of a case where an image with annotation data of FIG. 3B has been re-estimated and additionally written.

707 represents the annotation data that has been additionally written, and 708 represents the annotation data before the re-estimation. 709 represents input data for the originally-estimated data (in this figure, an automobile sensor). As this input data is not included in the image file, it is not changed from the original data.

In step S606, using the metadata generation and analysis unit 70, the system control unit 50A updates the estimation results for the annotation data in the image file 300, and records the updated estimation results in the external recording medium 91.

Figure 7C:
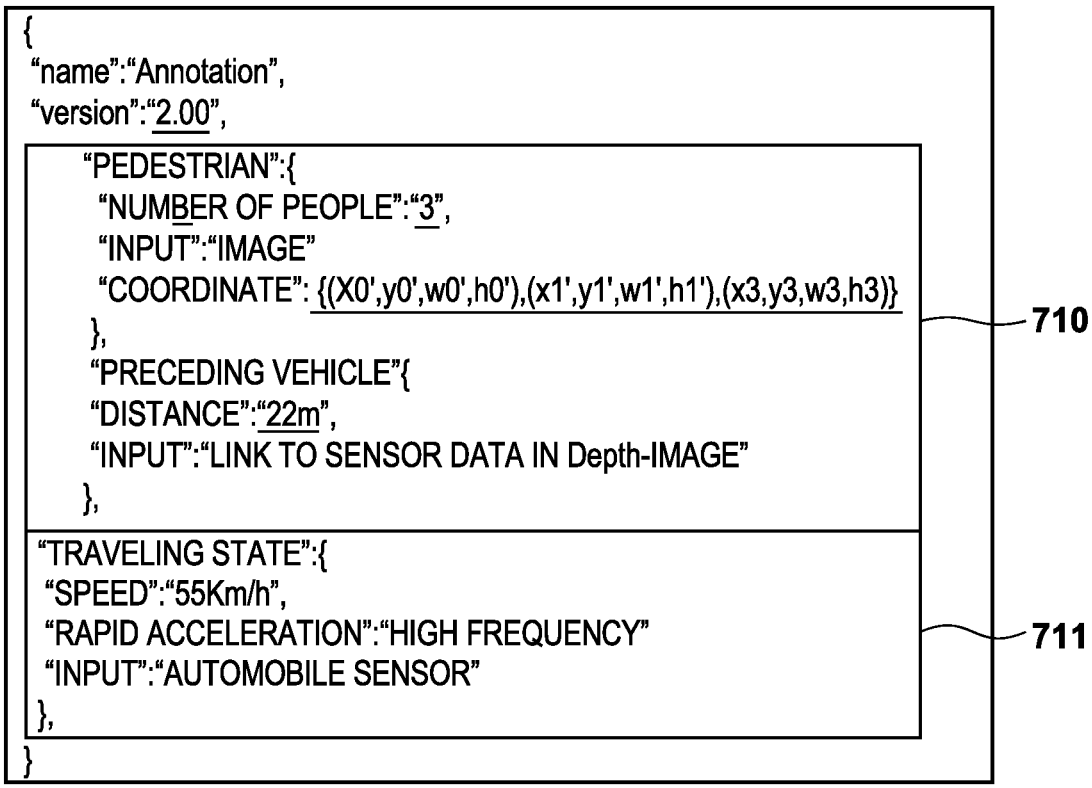

FIG. 7C shows an example of annotation data of a case where an image with annotation data of FIG. 3A has been re-estimated and updated.

710 represents the updated annotation data, and 711 represents input data for the originally-estimated data (in this figure, an automobile sensor). As this input data is not included in the image file, it is not changed from the original data.

FIG. 7D shows an example of annotation data of a case where an image with annotation data of FIG. 3B has been re-estimated and updated.

712 represents the updated annotation data, and 713 represents input data for the originally-estimated data (in this figure, an automobile sensor). As this input data is not included in the image file, it is not changed from the original data.

In the present embodiment, inputs for annotation information can be distinguished at the time of re-estimation as in step S605 and step S606. In this way, annotation information based on information that is not included in the image file can be held, and annotation information based on information that is included in the image file can be updated or additionally written.

In step S607, the system control unit 50A records (updates) the estimation model management information, which is information of the current estimation engine 73A, within MakerNote 302 of the image file 300.

Note that although the above has described an example in which the re-estimation processing is executed within the camera, the re-estimation may be performed on a personal computer or a cloud.

Returning to the description of FIG. 5, in step S511, the system control unit 50A determines whether an instruction for reproducing another image has been issued using an operation member included in the operation unit 63. In a case where the instruction for reproducing another image has been issued, the system control unit 50A causes processing to return to step S501, and repeats the above-described processing with respect to the reproduced image for which the instruction has been issued.

On the other hand, in a case where the instruction for reproducing another image has not been issued, the system control unit 50A determines whether an instruction for ending the reproduction processing has been issued in step S512. Then, if the instruction for ending the reproduction processing has not been issued, processing returns to step S503 and the above-described processing is repeated; if the instruction for ending the reproduction processing has been issued, the reproduction processing is ended.

Note that the present invention may be applied to a system composed of a plurality of devices (e.g., a host computer, an interface device, a scanner, a video camera, and so forth), or may be applied to an apparatus (e.g., a copier, a facsimile apparatus, and so forth) made up of one device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020794, filed Feb. 14, 2022, and Japanese Patent Application No. 2022-189533, filed Nov. 28, 2022 which are hereby incorporated by reference herein in their entirety.

What is claimed is:

1. An image processing apparatus comprising:
at least one processor or circuit configured to function as
a generation unit configured to generate an image file of captured image data, the generation unit generating the image file with estimation results related to the image data added thereto as metadata,
wherein the generation unit generates the metadata so that a first estimation result and a second estimation result are distinguishable from each other, the first estimation result being based on data that is included in the image file, the second estimation result being based on data that is not included in the image file, and
wherein the data that is not included in the image file includes pre-shooting live images or the data that is not included in the image file includes sound data.

2. The image processing apparatus according to claim 1, wherein
the first estimation result is an estimation result of performing estimation without using the data that is not included in the image file, and
the second estimation result is either an estimation result based on the data that is not included in the image file, or an estimation result based on the data that is not included in the image file and on the data that is included in the image file.

3. The image processing apparatus according to claim 1, wherein
the generation unit is capable of generating the image file with data used in estimation included therein.

4. The image processing apparatus according to claim 1, wherein
in generating the image file, the generation unit is capable of including, in the image file, data that has been obtained from an external device and used in estimation.

5. The image processing apparatus according to claim 1, wherein
the generation unit writes the first estimation result and the second estimation result in different regions of the image file, respectively.

6. The image processing apparatus according to claim 1, wherein the at least one processor or circuit is configured to further function as
a re-estimation unit configured to perform re-estimation based on the data that is included in the image file,
wherein in a case where the estimation results are rewritten, the re-estimation unit performs the rewrite so as not to update the second estimation result.

7. The image processing apparatus according to claim 6, wherein
in a case where the estimation results are rewritten, the re-estimation unit additionally writes a re-estimation result so as not to update the second estimation result.

8. The image processing apparatus according to claim 7, wherein
in a case where an output format of the estimation results is different from an output format of the re-estimation result, the re-estimation unit additionally writes the re-estimation result.

9. The image processing apparatus according to claim 6, wherein
in a case where the estimation results are rewritten, the re-estimation unit updates the first estimation result to the re-estimation result without updating the second estimation result.

10. The image processing apparatus according to claim 9, wherein
in a case where an output format of the estimation results is the same as an output format of the re-estimation result, the re-estimation unit updates the first estimation result to the re-estimation result.

11. An image capturing apparatus, comprising:
an image capturing device configured to capture an image; and
the image processing apparatus according to claim 1.

12. An image processing method comprising:
generating an image file of captured image data, the image file being generated with estimation results related to the image data added thereto as metadata,
wherein in the generating, the metadata is generated so that a first estimation result and a second estimation result are distinguishable from each other, the first estimation result being based on data that is included in the image file, the second estimation result being based on data that is not included in the image file, and
wherein the data that is not included in the image file includes pre-shooting live images or the data that is not included in the image file includes sound data.

13. A non-transitory computer-readable storage medium having recorded therein a program for causing a computer to execute an image processing method, the method comprising:
generating an image file of captured image data, the image file being generated with estimation results related to the image data added thereto as metadata,
wherein in the generating, the metadata is generated so that a first estimation result and a second estimation result are distinguishable from each other, the first estimation result being based on data that is included in the image file, the second estimation result being based on data that is not included in the image file, and
wherein the data that is not included in the image file includes pre-shooting live images or the data that is not included in the image file includes sound data.

* * * * *